(12) United States Patent
Bickerstaff et al.

(10) Patent No.: US 10,915,872 B1
(45) Date of Patent: Feb. 9, 2021

(54) AUTOMATIC RECEIPT CAPTURE

(71) Applicants: Jennifer Bickerstaff, Mountain View, CA (US); Qiang Wang, Mountain View, CA (US); Yu-Wei Hsu, San Francisco, CA (US)

(72) Inventors: Jennifer Bickerstaff, Mountain View, CA (US); Qiang Wang, Mountain View, CA (US); Yu-Wei Hsu, San Francisco, CA (US)

(73) Assignee: Intuit Inc., Mountain View, CA (US)

( * ) Notice: Subject to any disclaimer, the term of this patent is extended or adjusted under 35 U.S.C. 154(b) by 374 days.

(21) Appl. No.: 15/826,534

(22) Filed: Nov. 29, 2017

(51) Int. Cl.
*G06Q 20/04* (2012.01)
*G06Q 20/20* (2012.01)
*G06Q 20/32* (2012.01)
*G06Q 40/00* (2012.01)

(52) U.S. Cl.
CPC ......... *G06Q 20/047* (2020.05); *G06Q 20/209* (2013.01); *G06Q 20/322* (2013.01); *G06Q 40/10* (2013.01); *G06Q 40/123* (2013.12)

(58) Field of Classification Search
CPC .. G06Q 20/209; G06Q 20/322; G06Q 40/123; G06Q 40/10; G06Q 10/10; H04N 5/23212; H04N 5/23222
See application file for complete search history.

(56) References Cited

U.S. PATENT DOCUMENTS

| | | | | |
|---|---|---|---|---|
| 8,639,621 B1* | 1/2014 | Ellis | ................... | G06Q 30/0623 705/41 |
| 10,115,083 B1* | 10/2018 | Koeppel | .............. | G06Q 20/327 |
| 10,510,054 B1* | 12/2019 | Eidam | ................... | G06Q 20/102 |
| 2004/0083134 A1* | 4/2004 | Spero | ...................... | G06Q 40/12 705/16 |
| 2010/0306080 A1* | 12/2010 | Trandal | .................. | G06Q 10/10 705/26.8 |
| 2011/0026778 A1* | 2/2011 | Ye | ....................... | G06K 9/00221 382/118 |
| 2013/0085905 A1* | 4/2013 | Menon | ................... | G06Q 10/10 705/30 |
| 2013/0173466 A1* | 7/2013 | Lepisto | ............ | G06Q 20/40145 705/44 |

(Continued)

OTHER PUBLICATIONS

Joseph Lorenzo Hall, "The Beginning of the End of Sharing Banking Credentials", Jan. 25, 2017 (Year: 2017).*

*Primary Examiner* — Florian M Zeender
*Assistant Examiner* — Vanessa Deligi
(74) *Attorney, Agent, or Firm* — Ferguson Braswell Fraser Kubasta PC

(57) ABSTRACT

The method obtains, through use of secure delegated access, data representing a financial transaction by a user of a financial service. The data is obtained in at least near real time following occurrence of the financial transaction. The method makes a determination that the user is proximate to a merchant identified in the data and that the financial transaction is a business expense. In response to making the determination, the method causes auto-detection functionality to detect that the user is in possession of a receipt and causes auto-focus functionality to focus on the receipt. The auto-detection functionality and the auto-focus functionality use a camera on a mobile device of the user. The method then causes the camera to capture an image of the receipt.

18 Claims, 9 Drawing Sheets

(56) References Cited

U.S. PATENT DOCUMENTS

| | | | | |
|---|---|---|---|---|
| 2013/0232040 A1* | 9/2013 | Nuggehalli | ............ | G06K 9/2054 705/30 |
| 2014/0019317 A1* | 1/2014 | Casares | ................. | G06Q 30/06 705/30 |
| 2014/0067631 A1* | 3/2014 | Dhuse | .................... | G06Q 40/12 705/30 |
| 2015/0019409 A1* | 1/2015 | Vagiri | .................. | G06Q 20/405 705/39 |
| 2015/0088679 A1* | 3/2015 | Votaw | ................ | G06Q 20/0855 705/26.2 |
| 2015/0169780 A1* | 6/2015 | Mishra | ................ | G06F 16/9562 707/748 |
| 2015/0371339 A1* | 12/2015 | Pastore | .................. | G06Q 40/12 705/30 |
| 2016/0109954 A1* | 4/2016 | Harris | ................ | G06K 9/00268 345/156 |
| 2016/0148317 A1* | 5/2016 | Benway | ................. | G06Q 40/08 705/2 |
| 2016/0373536 A1* | 12/2016 | Boss | .................... | H04W 4/021 |
| 2017/0109391 A1* | 4/2017 | Rosen | ................. | G06F 16/254 |
| 2018/0350007 A1* | 12/2018 | Chen | .................. | G06F 16/2465 |

* cited by examiner

AUTOMATIC RECEIPT CAPTURE

In order to be audit proof as to business expenses that are tax-deductible, taxpayers should keep a copy of the corresponding receipts. However, such receipts are easily lost or misplaced, resulting in taxpayers wasting time searching for them. Even when such receipts are not lost or misplaced, they accumulate over time and take up space to store. Consequently, it would be advantageous to create and store a digital version of a receipt for a business expense shortly after the receipt is provided to a taxpayer.

SUMMARY

In general, in one aspect, the invention relates to a method for capturing an image of a receipt automatically. The method includes obtaining, through use of secure delegated access, data representing a financial transaction by a user of a financial service. The data is obtained in at least near real time following occurrence of the financial transaction. The method further includes making a determination that the user is proximate to a merchant identified in the data and that the financial transaction is a business expense. The method further includes, in response to making the determination, causing auto-detection functionality to detect that the user is in possession of a receipt and causing auto-focus functionality to focus on the receipt. The auto-detection functionality and the auto-focus functionality use a camera on a mobile device of the user. And the method further includes causing the camera to capture a first image that is the image of the receipt.

In general, in one aspect, the invention relates to non-transitory computer-readable storage configured to store a program for capturing an image of a receipt automatically, where the program, when executed, instructs a processor to obtain, through use of secure delegated access, data representing a financial transaction by a user of a financial service. The data is obtained in at least near real time following occurrence of the financial transaction. The program further instructs the processor to make a determination that the user is proximate to a merchant identified in the data and that the financial transaction is a business expense. The program further instructs the processor, in response to making the determination, to cause auto-detection functionality to detect that the user is in possession of a receipt and causing auto-focus functionality to focus on the receipt. The auto-detection functionality and the auto-focus functionality use a camera on a mobile device of the user The program further instructs the processor to cause the camera to capture a first image that is the image of the receipt.

In general, in one aspect, the invention relates to another method for capturing an image of a receipt automatically. The method includes obtaining, through use of secure delegated access, data representing a financial transaction by a user of a financial service. The data is obtained in at least near real time following occurrence of the financial transaction. The secure delegated access is based at least in part on the OAuth standard. The method further includes making a determination that the user is proximate to a merchant identified in the data. The method further includes, in response to making the determination, causing auto-detection functionality to detect that the user is in possession of a receipt and causing auto-focus functionality to focus on the receipt. The auto-detection functionality and the auto-focus functionality use a camera on a mobile device of the user. And the method further includes causing the camera to capture an image of the receipt.

Other aspects of the invention will be apparent from the following description and the appended claims.

Other aspects of the invention will be apparent from the following description and the appended claims.

DETAILED DESCRIPTION

Figure 1A:
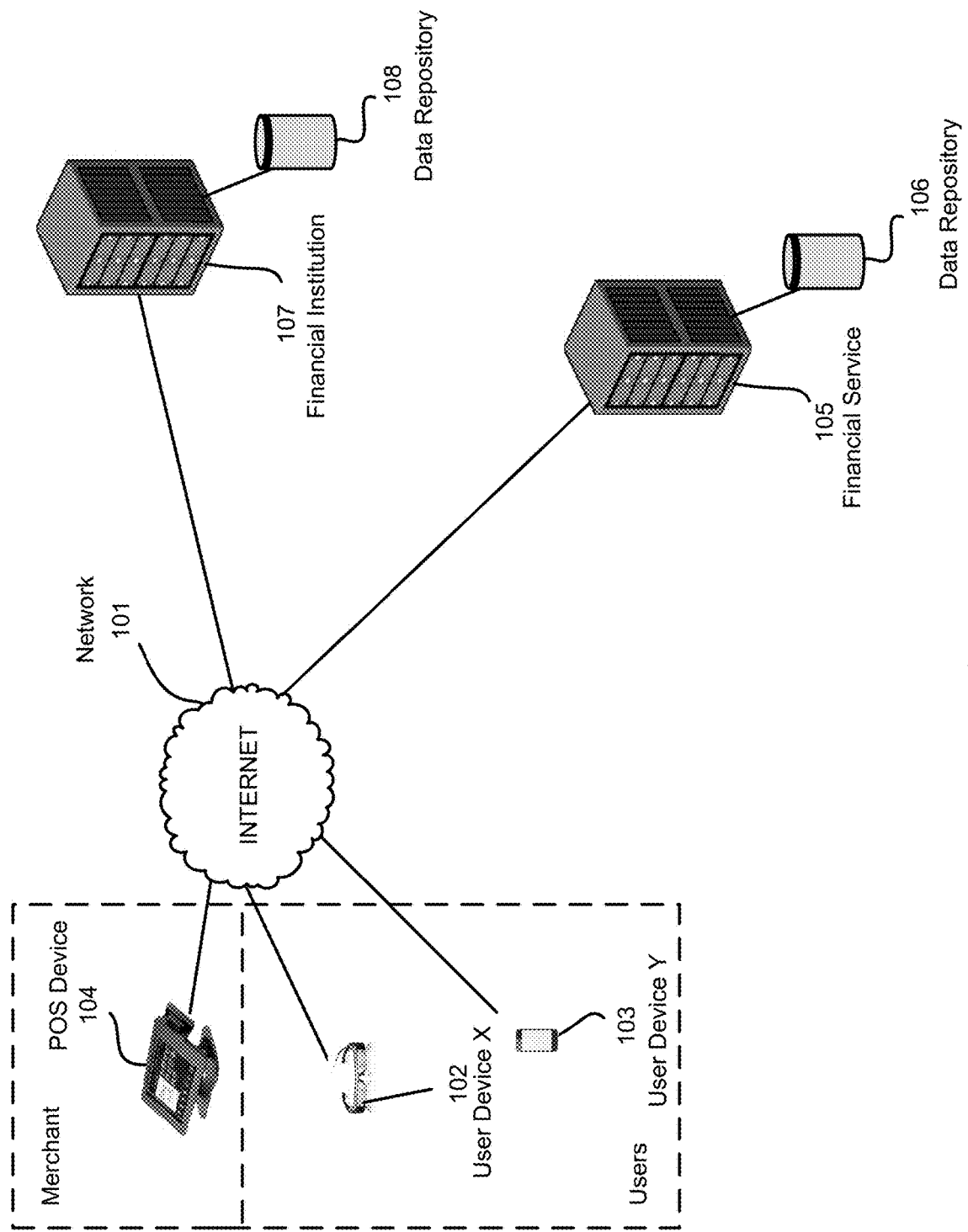
FIG. 1A depicts a network diagram showing a system for automatic receipt capture, in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or proceed) the second element in an ordering of elements.

In general, one or more embodiments of the invention involve the use of a camera in a wearable computer worn by a taxpayer to automatically create a digital image of a receipt for a tax-deductible expense, such as a business meal, business equipment, or other business expenses. Once the digital image is created, it is stored by an online tax service for later use by a taxpayer during preparation of an income tax return or later during any tax audit. Saving the digital image allows the taxpayer to dispose of the actual receipt without worrying about being audit-proof.

More specifically, in one or more embodiments of the invention, the user of an online tax service authorizes the tax service to obtain the user's credit card transactions from the user's credit card company in near real-time. When the user purchases a meal at a restaurant, the online tax service receives the details of the purchase and makes a determination that the meal is a business expense. If the user is wearing a wearable computer (such as smart glasses or similar) and is still in close proximity to the restaurant according to the time of the purchase or a Global Positioning System (GPS) in the wearable computer, the online tax service causes a camera in the wearable computer to detect the presence of the receipt, auto-focus on the receipt, and create a digital image of it.

FIG. 1A depicts a network diagram showing a system for automatic receipt capture, in accordance with one or more embodiments. As depicted in this figure, user computing device X (102) (e.g., a wearable computer), user computing device Y (103) (e.g., a mobile device such as a smartphone which might be an IPHONE®, ANDROID™ phone, WINDOWS® phone, etc., or a tablet computer, such as an IPAD®), and Point of Sale (POS) device (104) are connected (either directly or indirectly) by a network (101) (e.g., a wide area network (WAN) including the Internet, which might be wireless in part or in whole) to a financial service (105) with computing resources (e.g., hardware servers, data repositories, etc.) configured to host a financial application, such as a multi-user online tax application (that may be part of QUICKBOOKS SELF-EMPLOYED™), and a financial institution (107), such as a bank or credit card company with computing resources to manage the business (e.g., hardware server, cloud computing services, data repositories, etc.). In one or more embodiments, financial service (105) is a massively multi-user service (e.g., having thousands or millions of users).

In one or more embodiments, computing device X (102) is a wearable device, such as a pair of smart glasses (e.g., Osterhout Design Group (ODG) R7 Smartglasses) that includes: (a) hardware with one or more microprocessors (e.g., from the Snapdragon 835 family), volatile storage (e.g., RAM), and persistent storage (e.g., flash memory such as microSD); (b) an operating system (e.g., ODG Reticle OS Framework on Android) that runs on the hardware; (c) one or more inertial measurement units (IMUs) with one or more accelerometers, one or more gyroscopes, one or more magnetometers, one or more pedometers, and one or more barometers; (d) a global positioning system (GPS), another global navigation satellite system (GNSS), Visual-Inertial Odometry (VIO), or other location-identifying capability; (e) one or more auto-focusing cameras; (f) dual haptic feedback in temple are of the user device x (102); and (g) an Organic Light Emitting Diode (OLED) display.

In one or more embodiments, user computing device Y (103) is a smart phone and includes one or more of the following: (1) hardware with one or more microprocessors (e.g., from the ARM family or the x86 family), volatile storage (e.g., RAM), persistent storage (e.g., flash memory such as microSD); (2) an operating system (e.g., iOS®, ANDROID™, WINDOWS MOBILE®, LINUX®, SYMBIAN OS®, etc.) that runs on the hardware; (3) one or more accelerometers, one or more gyroscopes, one or more magnetometers, one or more pedometers, and one or more barometers; and (4) a global positioning system (GPS), another global navigation satellite system (GNSS), Visual-Inertial Odometry (VIO), or other location-identifying capability. In one or more embodiments, the POS device (104) and the servers at financial service (105) and financial institution (107) include hardware and an operating system.

In one or more embodiments, financial service (105) includes computing resources with a number of servers (e.g., racked servers) connected by a network (e.g., a local area network (LAN) or a WAN) to each other in a cluster (e.g., a load-balancing cluster, a HADOOP® cluster, a Beowulf cluster, etc.) or other distributed system which might run financial service software (e.g., web-server software, database software, etc.) and distributed-computing and/or cloud software such as Map-Reduce, Google File System, HADOOP®, HADOOP® File System, HADOOP® YARN, Hive, Dremel, CloudBase, Memcached, REDIS®, etc. The servers at financial service (105) might be connected to data repository (106). Data repository (106) might include flash memory, a redundant array of independent disks (RAID), and/or a storage area network (SAN), in one or more embodiments. Additionally or alternatively, financial service (105) and/or data repository (106) might be hosted wholly or partially in a public and/or private cloud, e.g., where the cloud resources serve as a platform-as-a-service (PaaS) or an infrastructure-as-a-service (IaaS).

Similarly, the servers at financial institution (107) might be connected to data repository (108) which might include flash memory, a redundant array of independent disks (RAID), and/or a storage area network (SAN), in one or more embodiments.

Returning to FIG. 1A, in one or more embodiments, user computing device X (102) and user computing device Y (103) each include a web browser as an application program (or app) or as part of an operating system. Examples of web browsers that might execute on user computing device X (102) and user computing device Y (103) include SAFARI®, MOZILLA FIREFOX®, and Android™. It will be appreciated that users of user computing device X (102) and/or user computing device Y (103) might use web browsers to access financial service (105) and/or financial institution (107). Additionally or alternatively, users of user computing device X (102) and/or user computing device Y (103) might use other application programs or apps to access financial service (105) and/or financial institution (107).

Figure 1B:
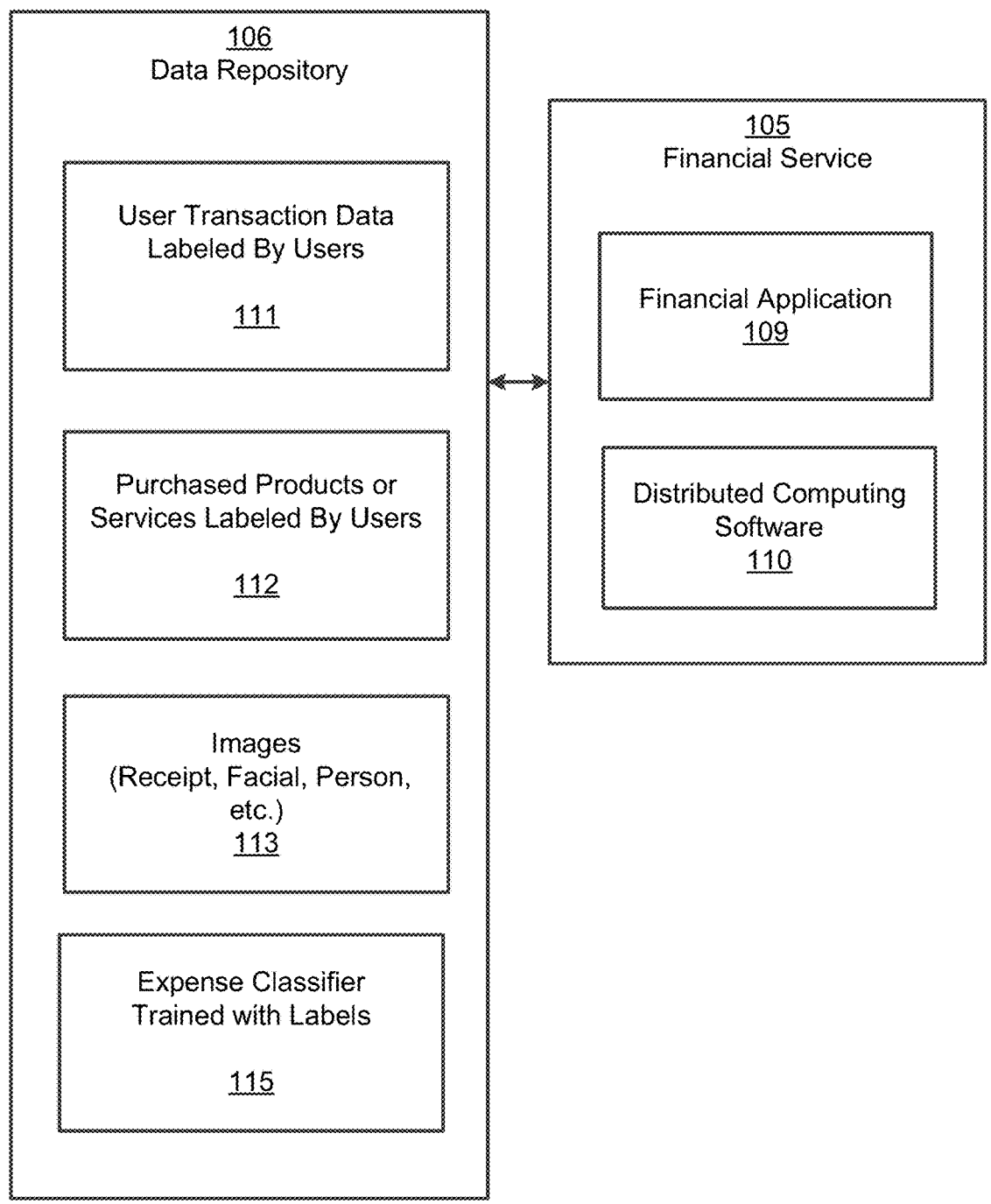
FIG. 1B is a diagram showing the components used for automatic receipt capture, in accordance with one or more embodiments.

FIG. 1B is a diagram showing the components used for automatic receipt capture, in accordance with one or more embodiments. In one or more embodiments, financial service (105) uses data repository (106) to store algorithms and data related to the processes described in this disclosure, as shown in FIG. 1B. More specifically, financial service (105) might use data repository (106) to store accounting and/or financial data, including labeled accounting and/or financial data (111) related to the transactions of the users of the online financial application (109). In one or more embodiments, user transaction data (111) might include data such as transaction date and time, payment amount, merchant name, merchant location, product or service purchased, etc. In one or more embodiments, user transaction data (111) might have been entered by a user or obtained by the financial service (105) on behalf of a user from a financial institution such as a bank or credit-card company, e.g., using secured delegated access such as OAuth or an application programming interface (API) that supports an open financial exchange (OFX) format.

As used in this disclosure, an expense is a cash outflow or an asset outflow. A business expense is an expense that is allowable as a deduction on an income tax return. A non-business expense is an expense that is not be allowable as a deduction on an income tax return. In one or more embodiments, the user transaction data (111) might be labeled as a business expense or a non-business expense. In one or more embodiments, the labeling might be done by a user of the financial application (109), e.g., using one or more views in a graphical user interface (GUI) displayed by financial application (109).

Also as shown in this figure, the financial service (105) might use data repository (106) to store purchased products or services (112) labeled by users. In one or more embodiments, a receipt from a merchant might include an itemization of one or more purchased products or services. In one or more embodiments, a purchased product or service is labeled as a business expense or a non-business expense. In one or more embodiments, the labeling might be done by a user of the financial application (109), e.g., using one or more views in a graphical user interface (GUI) displayed by financial application (109).

As shown in this figure, the financial service (105) might use data repository (106) to store images (113) (such as a receipt image, a facial image, a person image, etc.) taken by users, e.g., using a camera in a wearable computer such as user computing device X (102 in FIG. 1A) or a camera in a mobile device such as user computing device Y (103 in FIG. 1A), in accordance with a process described below.

In one or more embodiments, financial service (105) might also use data repository (106) to store algorithms such as expense classifier (115), which might be trained with labeled user transaction data (111) and/or labeled purchased products or services (112). In one or more embodiments, expense classifier (115) is a binomial or multinomial classifier (e.g., based on logistic regression, naïve Bayes, random forests, etc.). Additionally or alternatively, in one or more embodiments, expense classifier (115) might learn using clustering functionality. In one or more embodiments, expense classifier (115) is based on the Scikit-learn library. Expense classifier (115) might learn using deep learning neural networks, e.g., based on the TensorFlow library. In one or more embodiments, the expense classifier (115) runs on the server computing devices for the financial services (105), along with the financial application (109) and distributed computing software (110), including HADOOP®, HADOOP® YARN, etc.

Figure 2A:
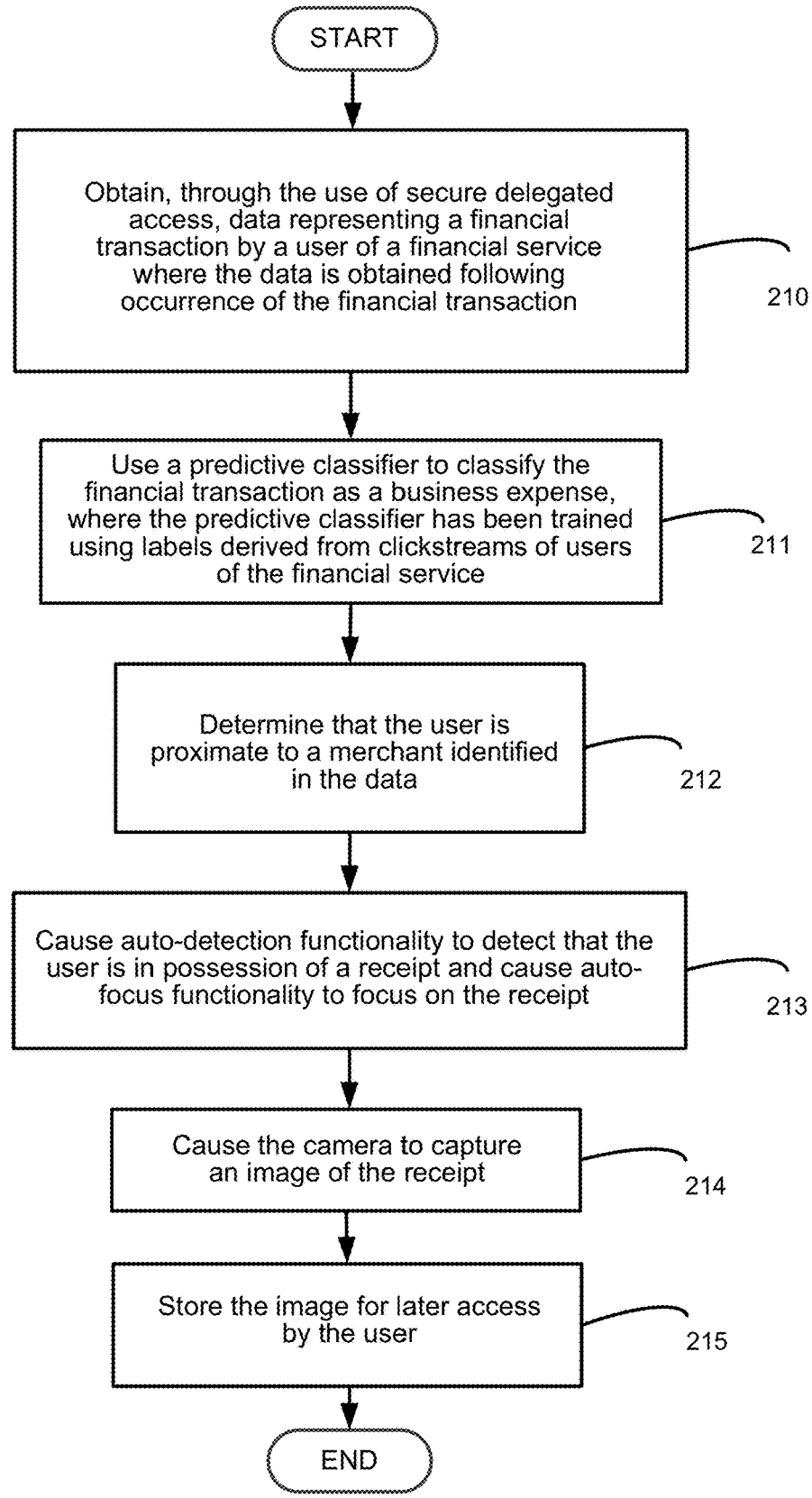
FIGS. 2A, 2B, 2C, and 2D each depict a flowchart diagram of a process for automatic receipt capture using a wearable computer, in accordance with one or more embodiments.

FIG. 2A depicts a flowchart diagram of a process for automatic receipt capture, in accordance with one or more embodiments. In one or more embodiments, the operations shown in this figure might be performed by software running on servers at a financial service using a data repository. In one or more embodiments, one or more of the operations shown in FIG. 2A and described below are performed on clustered computers running distributed-computing software that supports batch processing based on a Map-Reduce architecture (e.g., HADOOP®). In one or more embodiments, one or more of the operations shown in FIG. 2A are performed on clustered computers running distributed-computing software that supports stream processing based on a Map-Reduce architecture (e.g., HADOOP® YARN architecture). In one or more embodiments, all or some of the operations shown in this figure might be performed by software (e.g., a client application including, for example, a webpage with embedded JAVASCRIPT® scripting language program code or ACTIONSCRIPT® scripting language program code) running on a client device (e.g., user computing device X (102 in FIG. 1A) or user computing device Y (103 in FIG. 1A)).

While the various operations in this flowchart and the flowcharts below are presented and described sequentially, one of ordinary skill will appreciate that some or all of the operations may be executed in different orders, may be combined or omitted, and some or all of the operations may be executed in parallel. Furthermore, the operations may be performed actively or passively. For example, some operations may be performed using polling or be interrupt-driven, in accordance with one or more embodiments of the invention. By way of an example, determination operations may not require a processor to process an instruction unless an interrupt is received to signify that a condition exists, in accordance with one or more embodiments of the invention. As another example, determination operations may be performed by performing a test, such as checking a data value to test whether the value is consistent with the tested condition, in accordance with one or more embodiments of the invention.

As depicted in FIG. 2A, software at a financial service (e.g., software that is a component of a financial application) obtains, through the use of secure delegated access, data representing a financial transaction by a user of a financial service, in operation 210. In one or more embodiments, the secure delegated access is based on the OAuth standard. And in one or more embodiments, the data is obtained in real time (or near real time) following occurrence of the financial transaction.

In operation 211, the software uses a predictive classifier, e.g., an expense classifier, to classify the financial transaction as a business expense. If the predictive classifier classifies the financial transaction as a nonbusiness expense, the process would terminate. In one or more embodiments, the predictive classifier has been trained using labels derived from the clickstreams of users of the financial service.

In operation 212, the software makes a determination that the user is proximate to a merchant identified in the data. In one or more embodiments, this determination might be made using: (a) a GPS system, another global navigation satellite system (GNSS), a hybrid positioning system, or Visual-Inertial Odometry (VIO) on, e.g., a wearable computer or on a user computing device being held by the user; (b) a timestamp in the data; and/or (c) information from a merchant POS device. Here it will be appreciated that a hybrid positioning system is a system for finding the location of a mobile device using several different positioning technologies. Usually GPS is a major component of such systems, but it is combined with cell tower signals, wireless internet signals, Bluetooth sensors, IP addresses, network environment data, etc. It will be appreciated that use of this proximity requirement conserves power, e.g., battery life, and lessens the amount of intrusion on the privacy of others. So, for example, if the user is within a pre-determined distance of the merchant, say, 10 yards, and the transaction occurred a short time earlier, say, 5 minutes, the determination is made that the user is proximate to the merchant.

In operation 213, the software causes: (1) auto-detection functionality to detect that the user is in possession of a receipt; and (2) auto-focus functionality to focus on the receipt. In one or more embodiments, the auto-detection functionality and/or auto-focus functionality uses a camera on a computing device worn by the user or a camera on a user computing device being held by the user.

In an example embodiment, the auto-detection functionality and/or auto-focus functionality might be based on the technology described in co-owned U.S. Pat. No. 8,699,090 by Madhani, entitled "Automated Image Capture Based on Spatial Stability Information", and/or co-owned U.S. Pat. No. 8,923,619 by Madhani et al., entitled "Method and System for Creating Optimized Images for Data Identification and Extraction", both of which are incorporated herein by reference. The former patent describes, among other things, the automatic capture of an image by a mobile device when spatial-position information associated with the mobile device (e.g., as measured by an accelerometer and/or a gyroscope) remains within a predefined range for a predefined period of time. The latter patent describes, among other things, the automatic capture of an image by a mobile device, where the image is aggregated from a number of image blocks within the image, each of which is captured separately using a focus adjustment location with an optimized focus setting.

Returning to FIG. 2A, the software causes the camera to capture an image of a receipt, a person, a face, etc. in operation 214. Then in operation 215, a data repository (106) stores the image for later access by the user, e.g., when filling out a tax return or defending against a tax audit. In one or more embodiments, the image might be associated with the corresponding user transaction data before being stored.

Figure 2B:
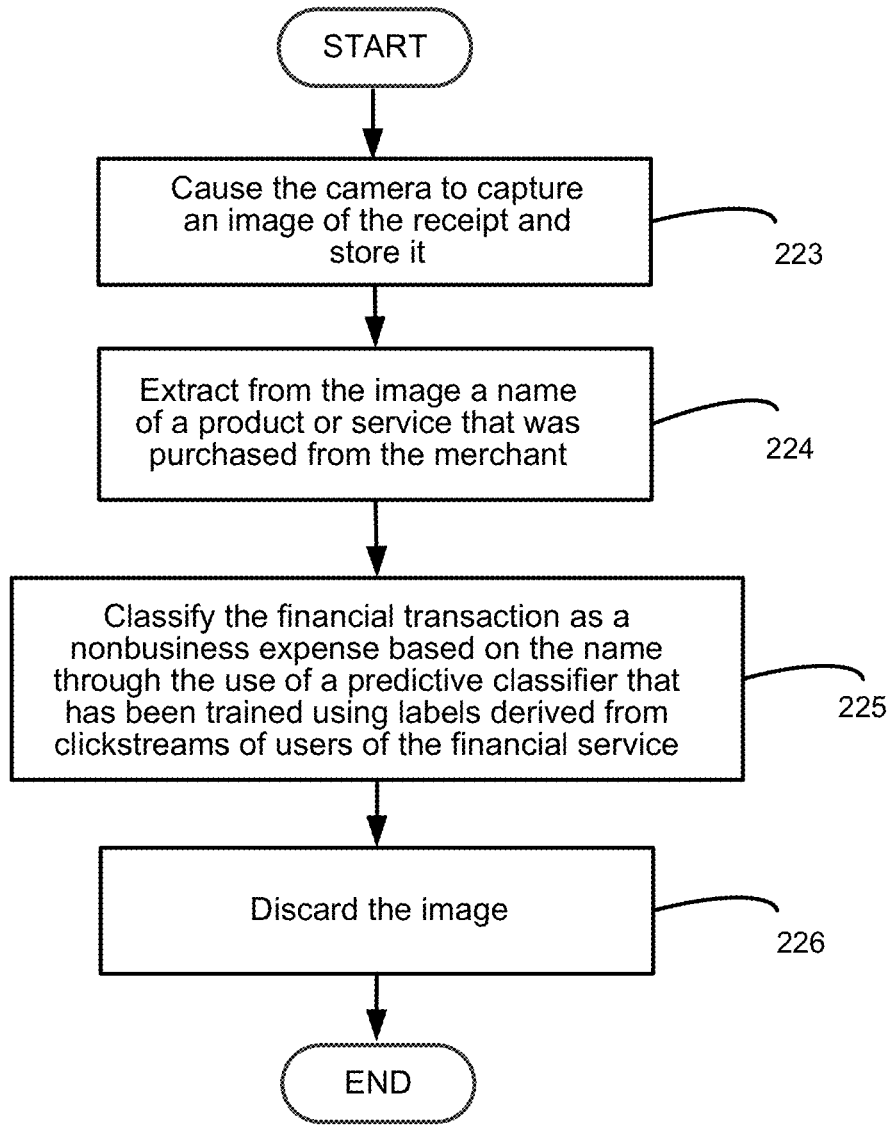

FIG. 2B depicts another flowchart diagram of a process for automatic receipt capture, in accordance with one or more embodiments. The first four operations shown in the flowchart diagram for FIG. 2A occur in this process as well, but are not depicted here in order to emphasize the operations that differ between the two processes. This statement also applies to the processes shown in FIGS. 2C, 2D, and 2E. In operation 223, the camera captures an image of the receipt. The software extracts from the image a name of a product or service that was purchased from the merchant, in operation 224. In operation 225, the software classifies the financial transaction as a nonbusiness expense based on the name through the use of a predictive classifier, e.g., an expense classifier that has been trained using labels derived from the clickstreams of users of the financial service. Then in operation 226, the receipt is discarded, e.g., by removing it from storage.

In one or more embodiments, the predictive classifier used in operation 211 is not the same predictive classifier used in operation 225, e.g., they might be trained using separate sets of labels.

Figure 2C:
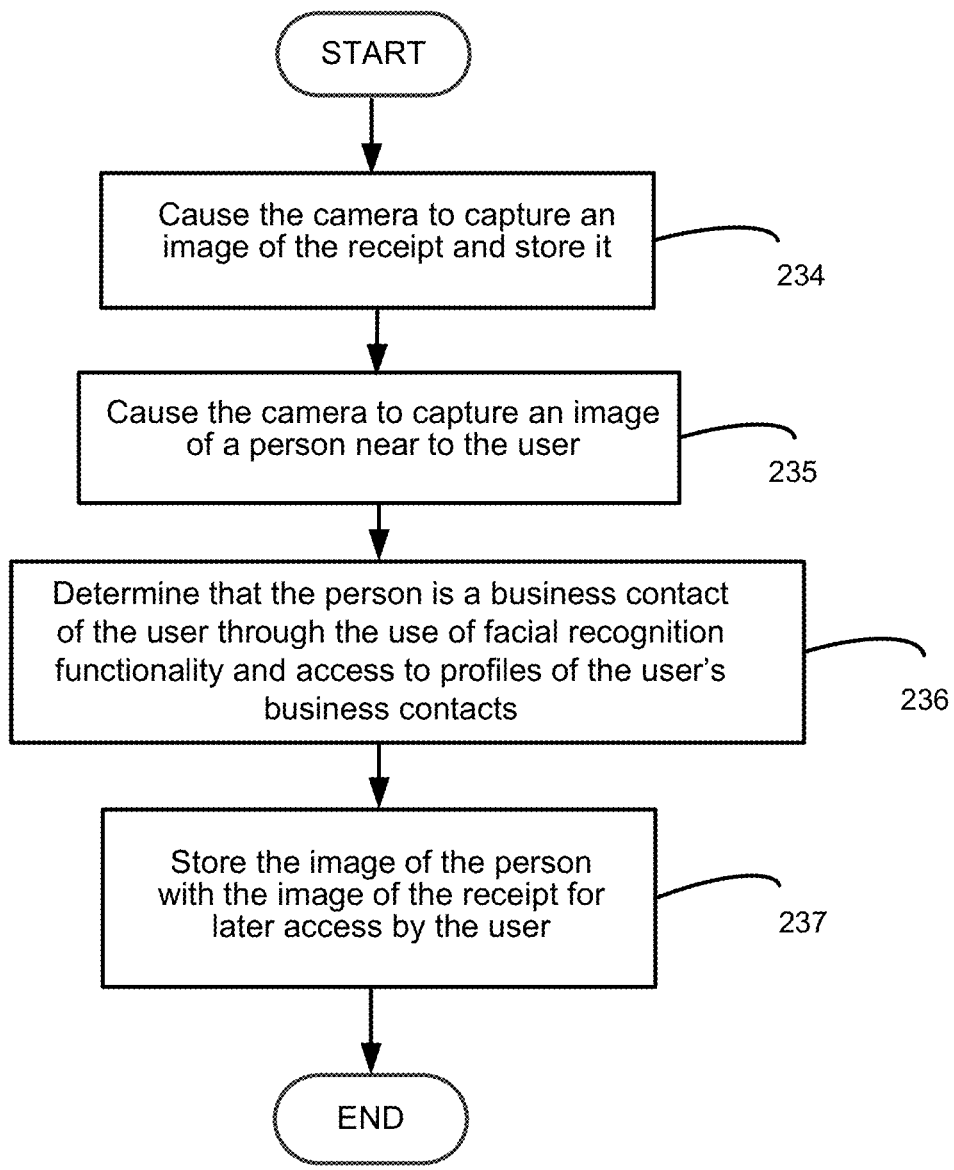

FIG. 2C depicts another flowchart diagram of a process for automatic receipt capture, in accordance with one or more embodiments. The camera captures an image of the receipt and stores the image, in operation 234. In operation 235, the software causes the camera to capture an image of a person near (e.g., within 5 feet) to the user. In operation 236, a determination is made that the person is a business contact of the user through the use of facial recognition functionality (e.g., DeepFace) and access to profiles of the user's business contacts (e.g., through an API exposed by a contact manager or a social network, such as LinkedIn or Facebook). Then, in operation 237, the software stores in a data repository the image for later access by the user, e.g., when filling out a tax return or defending against a tax audit. In one or more embodiments, the image might be associated with the corresponding user transaction data before being stored.

Figure 2D:
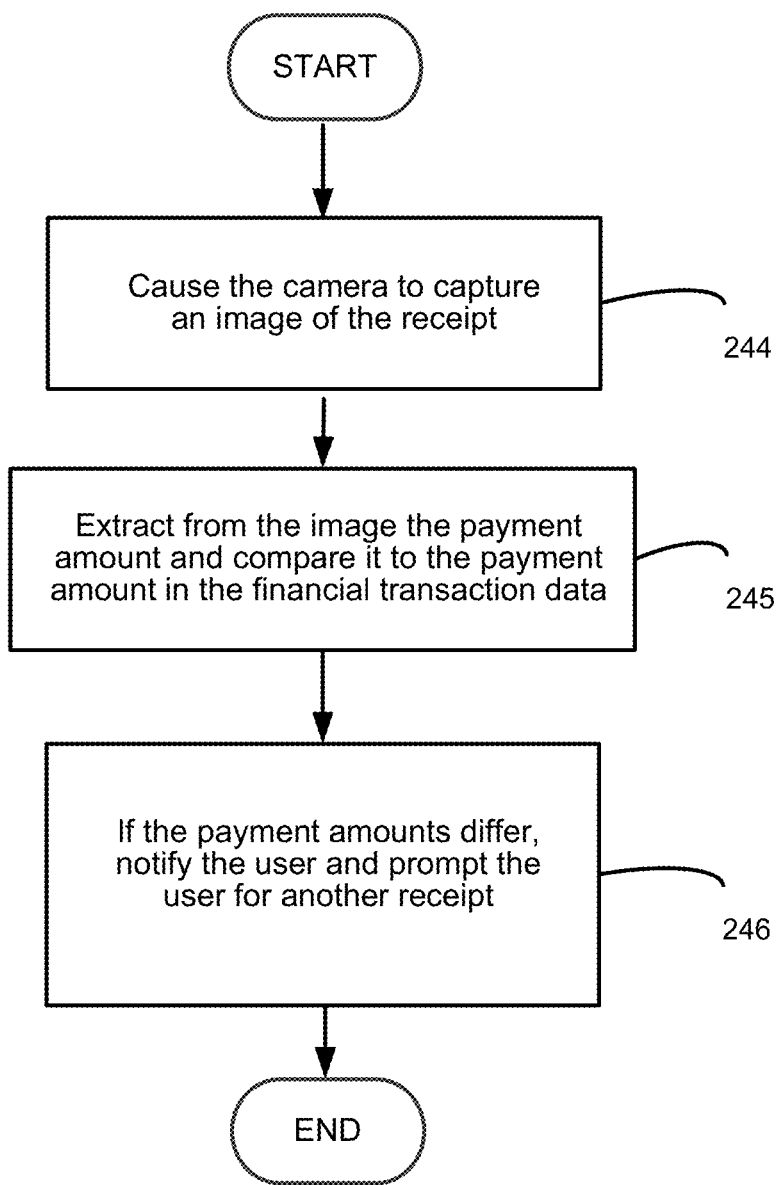

FIG. 2D depicts another flowchart diagram of a process for automatic receipt capture, in accordance with one or more embodiments. In operation 244, the camera captures an image of the receipt. In operation 245, the software extracts from the image the payment amount and compares it to the payment amount in the financial transaction data. Then, if the payment amounts differ, the user is notified (e.g., using a GUI dialog, verbally through a conversational interface, using haptic feedback in temple area of smart glasses, etc.) and prompts the user for another receipt.

Figure 3:
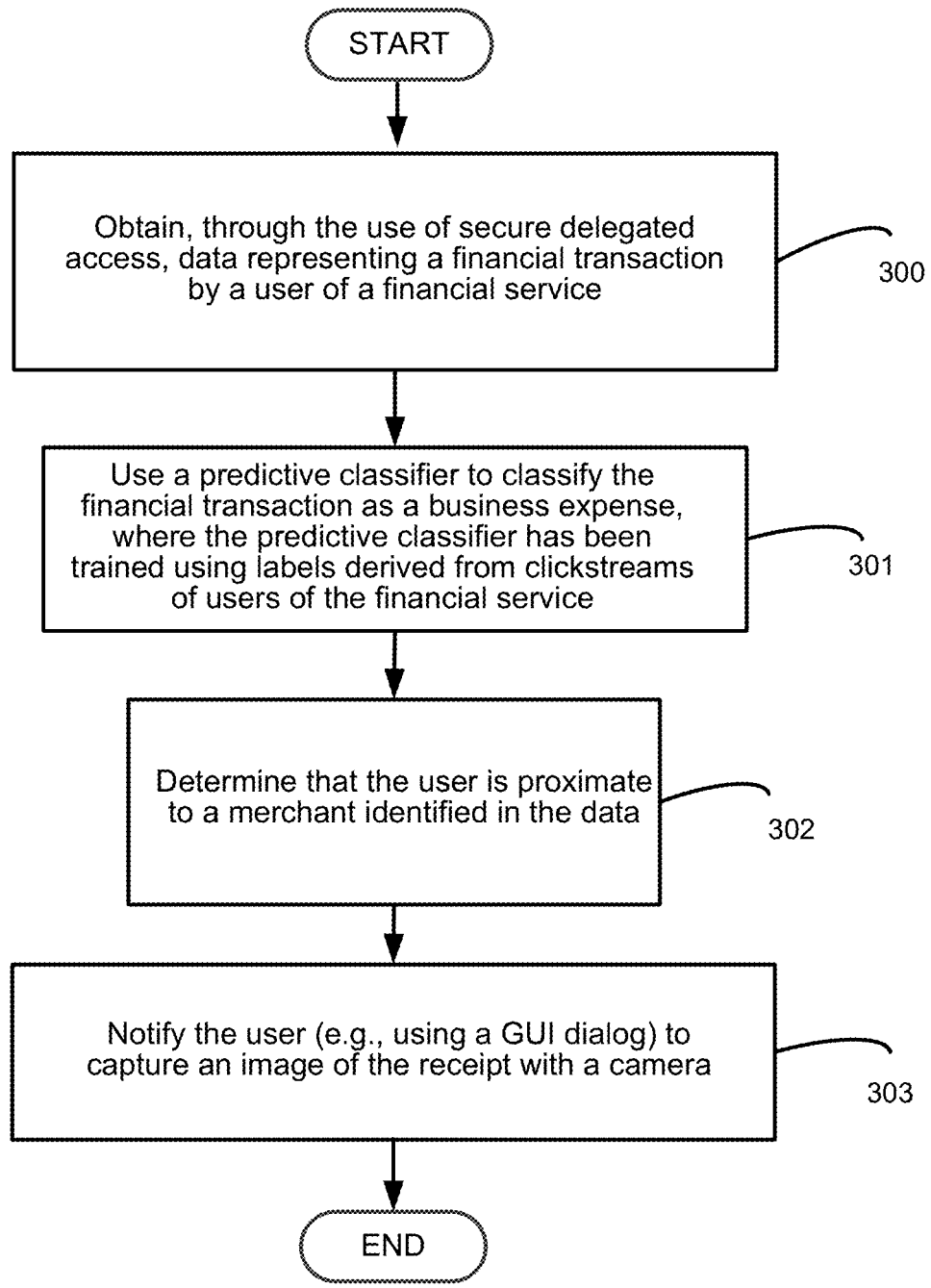
FIG. 3 depicts a flowchart diagram of a process for automatic receipt capture using a smartphone, in accordance with one or more embodiments.

FIG. 3 depicts a flowchart diagram of a process for receipt capture using a mobile device such as a smartphone, in accordance with one or more embodiments. As depicted in FIG. 3, software at a financial service (e.g., software that is a component of a financial application) obtains, through the use of secure delegated access, data representing a financial transaction by a user of a financial service, in operation 300.

Here again, in one or more embodiments, the secure delegated access is based on the OAuth standard. And, in one or more embodiments, the data is obtained in real time (or near real time) following occurrence of the financial transaction.

In operation 301, a predictive classifier, e.g., expense classifier, is used to classify the financial transaction as a business expense. If the predictive classifier classifies the financial transaction as a nonbusiness expense, the process would terminate. In one or more embodiments, the predictive classifier has been trained using labels derived from the clickstreams of users of the financial service.

In operation 302, a determination is made that the user is proximate to a merchant identified in the data. In one or more embodiments, the determination is made through the use of (a) GPS, e.g., the GPS on a user computing device, another global navigation satellite system (GNSS), a hybrid positioning system, or Visual-Inertial Odometry (VIO); (b) a timestamp in the data, and/or (c) a merchant POS. Then, in operation 303, the user is notified (e.g., using a GUI dialog, verbally through a conversational interface, using haptic feedback, etc.) to capture an image with a camera on the user's mobile device.

The following use case is for explanatory purposes only and not intended to limit the scope of the invention.

Figure 4:
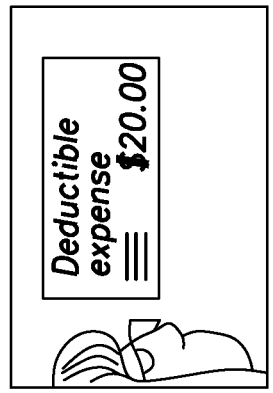
FIG. 4 depicts a drawing showing a use case for automatic receipt capture, in accordance with one or more embodiments.
Figure 4:
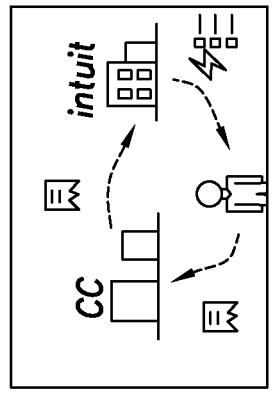
Figure 4:
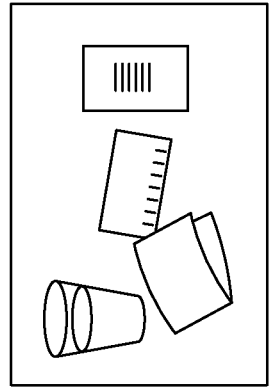
Figure 4:
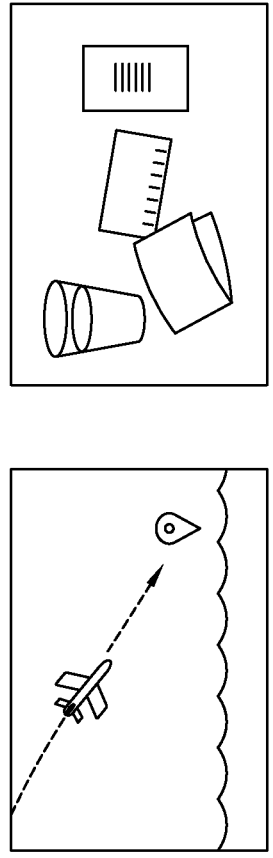
Figure 4:
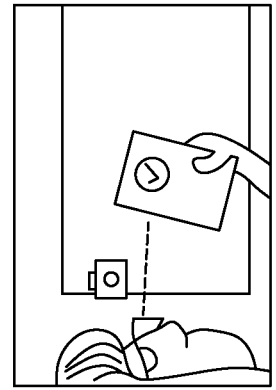

In the use case shown in FIG. 4, a financial service hosts an online financial application that can be used to prepare income taxes. A user of the financial application is a wedding photographer named Julie. As shown in frame 400, Julie travels to the Bahamas to photograph a wedding for a client. In frame 401, Julie purchases lunch in a restaurant and receives a receipt. In frame 402, software associated with the financial application uses secure delegated access based on OAuth to obtain data related to the lunch purchase from Julie's credit card company in near real time and inputs the data to an expense classifier that uses logistic regression. The classifier predicts that the expense is a business expense, e.g., based on the items ordered. In frame 403, the software activates auto-detection functionality in Julie's smart glasses and that functionality detects that Julie is holding a receipt from the restaurant. In frame 404, a camera in Julie's smart glasses captures an image of the receipt and the software stores it for Julie's later use, e.g., when preparing her income tax return.

Figure 5A:
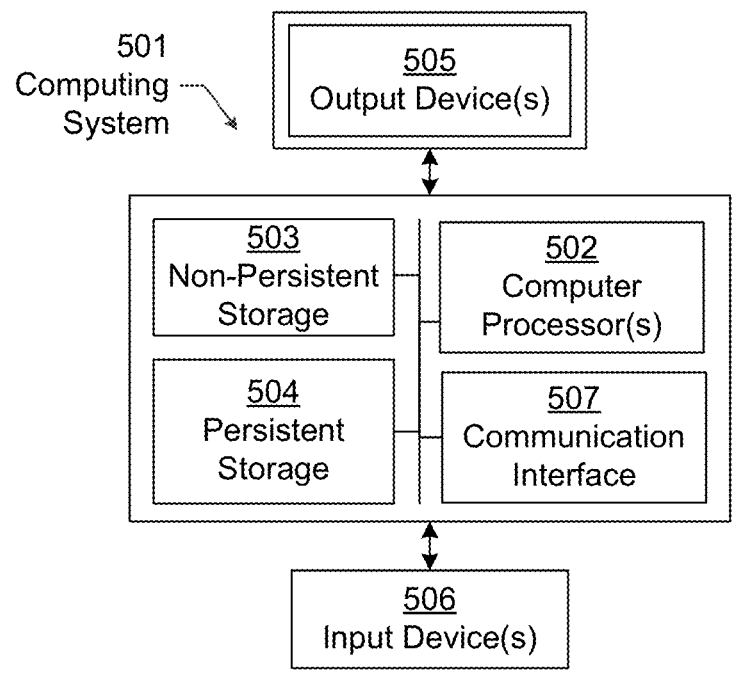
FIGS. 5A and 5B depict diagrams showing a computing system, in accordance with one or more embodiments of the invention.

Embodiments of the invention, including user computing device X (102) and user computing device Y (103), may be implemented on a computing system. Any combination of mobile, desktop, server, embedded, or other types of hardware may be used. For example, as shown in FIG. 5A, the computing system (501) may include one or more computer processor(s) (502), associated memory (503) (e.g., random access memory (RAM), cache memory, flash memory, etc.), one or more storage device(s) (504) (e.g., a hard disk, an optical drive such as a compact disk (CD) drive or digital versatile disk (DVD) drive, a flash memory stick, etc.), and numerous other elements and functionalities. The computer processor(s) (502) may be an integrated circuit for processing instructions. For example, the computer processor(s) may be one or more cores, or micro-cores of a processor. The computing system (501) may also include one or more input device(s) (506), such as a touchscreen, keyboard, mouse, microphone, touchpad, electronic pen, or any other type of input device. Further, the computing system (501) may include one or more output device(s) (505), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (501) may be connected to a network (520) (e.g., a local area network (LAN), a wide area network (WAN) such as the Internet, mobile network, or any other type of network) via a network interface connection (not shown). The input and output device(s) may be locally or remotely (e.g., via the network (520)) connected to the computer processor(s) (502), memory (503), and storage device(s) (504). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (501) may be located at a remote location and connected to the other elements over a network (520). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

Figure 5B:
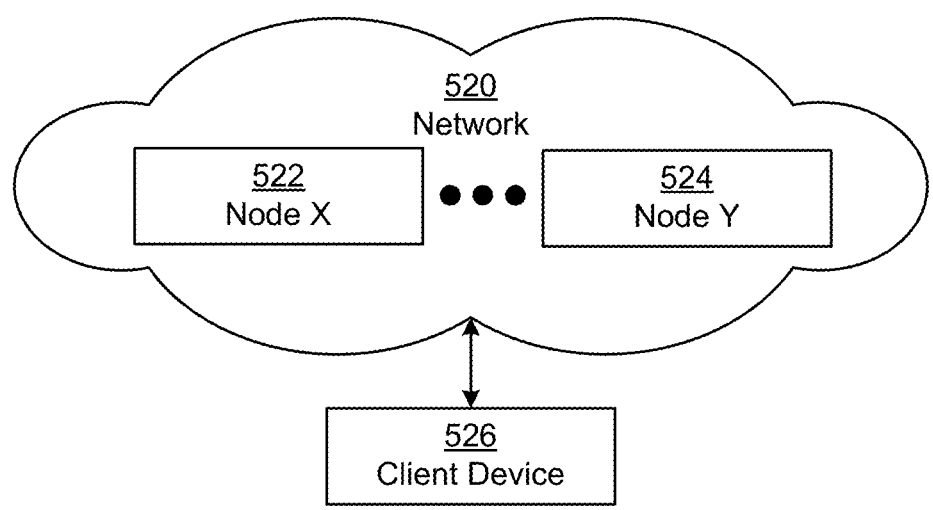

As noted above, the computing system (501) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (501) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 5A and the nodes and/or client device in FIG. 5B. Other functions may be performed using one or more embodiments of the invention.

Although example embodiments of the inventions have been described in some detail for purposes of clarity of understanding, it will be apparent that certain changes and modifications can be practiced within the scope of the following claims. Moreover, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed is:

1. A method for capturing an image of a receipt automatically, comprising:
    obtaining, through use of secure delegated access, data representing a financial transaction by a user of a financial service, wherein the data is obtained in at least near real time following occurrence of the financial transaction;
    making a determination, using a positioning system of a first user device controlled by the user, that the user is physically proximate to a merchant identified in the data and that the financial transaction is a business expense;

in response to making the determination, causing auto-detection functionality of a second user device to automatically detect that the user is in physical possession of the receipt and causing auto-focus functionality of the second user device to automatically focus on the receipt, wherein the second user device is worn on a head of the user, the second user device having a camera;

causing the camera to capture a first image that is the image of the receipt;

in response to making the determination, causing the camera to capture a second image of at least one person near to the user;

determining that the at least one person is a business contact of the user through use of facial recognition functionality and access to profiles of business contacts of the user;

predicting, using a predictive classifier comprising a machine learning model which takes as input second data from the image of the receipt, a classification of an expense in the receipt;

automatically entering the classification of the expense and an amount of the receipt into a financial service, wherein the financial service comprises software executing on a computer; and associating and storing, in the financial service, the first image of the receipt, the second image of the at least one person, and the classification with the data representing the financial transaction.

2. The method of claim 1, wherein the predictive classifier has been trained using labels derived, at least in part, from clickstreams of users of the financial service.

3. The method of claim 1, wherein the determination that the user is proximate to the merchant is based at least in part on a distance measured using a global positioning system (GPS) or a hybrid positioning system.

4. The method of claim 1, wherein the determination that the user is proximate to the merchant is based at least in part on a time for the financial transaction and wherein the time has been extracted from the data.

5. The method of claim 1, wherein the second user devices comprises eyeglasses to which the camera is attached.

6. The method of claim 1, wherein the secure delegated access is based at least in part on an OAuth standard.

7. A non-transitory computer-readable storage medium storing a program for capturing an image of a receipt automatically, the program having instructions which when executed on a processor, perform:

obtaining, through use of secure delegated access, data representing a financial transaction by a user of a financial service, wherein the data is obtained in at least near real time following occurrence of the financial transaction;

making a determination, using a positioning system of a first user device controlled by the user, that the user is physically proximate to a merchant identified in the data and that the financial transaction is a business expense;

in response to making the determination, causing auto-detection functionality of a second user device to automatically detect that the user is in physical possession of the receipt and causing auto-focus functionality of the second user device to automatically focus on the receipt, wherein the second user device is worn on a head of the user, the second user device having a camera;

causing the camera to capture a first image that is the image of the receipt;

in response to making the determination, cause the camera to capture a second image of at least one person near to the user;

determine that the at least one person is a business contact of the user through use of facial recognition functionality and access to profiles of business contacts of the user;

predicting, using a second predictive classifier comprising a machine learning model which takes as input second data from the image of the receipt, a classification of an expense in the receipt;

automatically enter the classification of the expense and an amount of the receipt into a financial service, wherein the financial service comprises software executing on a computer; and associate and store, in the financial service, the first image of the receipt, the second image of the at least one person, and the classification with the data representing the financial transaction.

8. The computer-readable storage medium of claim 7, wherein the predictive classifier has been trained using labels derived at least in part from clickstreams of users of the financial service.

9. The computer-readable storage medium of claim 7, wherein the determination that the user is proximate to the merchant is based at least in part on a distance measured using a global positioning system (GPS) or a hybrid positioning system.

10. The computer-readable storage medium of claim 7, wherein the determination that the user is proximate to the merchant is based at least in part on a time for the financial transaction and wherein the time has been extracted from the data.

11. The computer-readable storage media of claim 7, wherein the second user devices comprises eyeglasses to which the camera is attached.

12. The computer-readable storage media of claim 7, wherein the secure delegated access is based at least in part on an OAuth standard.

13. A method for capturing an image of a receipt automatically, comprising:

obtaining, through use of secure delegated access, data representing a financial transaction by a user of a financial service, wherein the data is obtained in at least near real time following occurrence of the financial transaction;

making a determination, using a positioning system of a first user device controlled by the user, that the user is physically proximate to a merchant identified in the data and that the financial transaction is a business expense;

in response to making the determination, causing auto-detection functionality of a second user device to automatically detect that the user is in physical possession of the receipt and causing auto-focus functionality of the second user device to automatically focus on the receipt, wherein the second user device is worn on a head of the user, the second user device having a camera;

causing the camera to capture a first image that is the image of the receipt;

extracting, from the first image, a first payment amount of the receipt;

comparing, the first payment amount to a second payment amount of the financial transaction;

responsive to a non-match between the first payment amount and the second payment amount, notifying the user and prompting the user for a second receipt;

causing the auto-detection functionality of the second user device to automatically detect that the user is in physical possession of the second receipt and causing the auto-focus functionality to automatically focus on the second receipt;

causing the camera to capture a second image that is the image of the second receipt;

extracting a third payment amount from the image of the second receipt;

verifying that the third payment amount of the second receipt matches the second payment amount of the financial transaction;

in response to verifying, causing the camera to capture a third image of at least one person near to the user;

determining that the at least one person is a business contact of the user through use of facial recognition functionality and access to profiles of business contacts of the user;

storing the third image with the data and the second image of the second receipt for later access by the user;

predicting, using a predictive classifier comprising a machine learning model which takes as input second data from the image of the second receipt, a classification of an expense in the second receipt;

automatically entering the classification of the expense and an amount of the second receipt into a financial service, wherein the financial service comprises software executing on a computer; and associating and storing, in the financial service, the third image of the second receipt, the second image of the at least one person, and the classification with the data representing the financial transaction.

14. The method of claim 13, wherein the predictive classifier has been trained using labels derived, at least in part, from clickstreams of users of the financial service.

15. The method of claim 13, wherein the determination that the user is proximate to the merchant is based at least in part on a distance measured using a global positioning system (GPS) or a hybrid positioning system.

16. The method of claim 13, wherein the determination that the user is proximate to the merchant is based at least in part on a time for the financial transaction and wherein the time has been extracted from the data.

17. The method of claim 13, wherein the second user devices comprises eyeglasses to which the camera is attached.

18. The method of claim 13, wherein the secure delegated access is based at least in part on an OAuth standard.

* * * * *